April 25, 1939.  J. R. RICHARDS  2,155,684
DOG EXERCISING DEVICE
Filed July 1, 1937   6 Sheets-Sheet 1

INVENTOR.
John R. Richards
BY John F. Brezina
ATTORNEY.

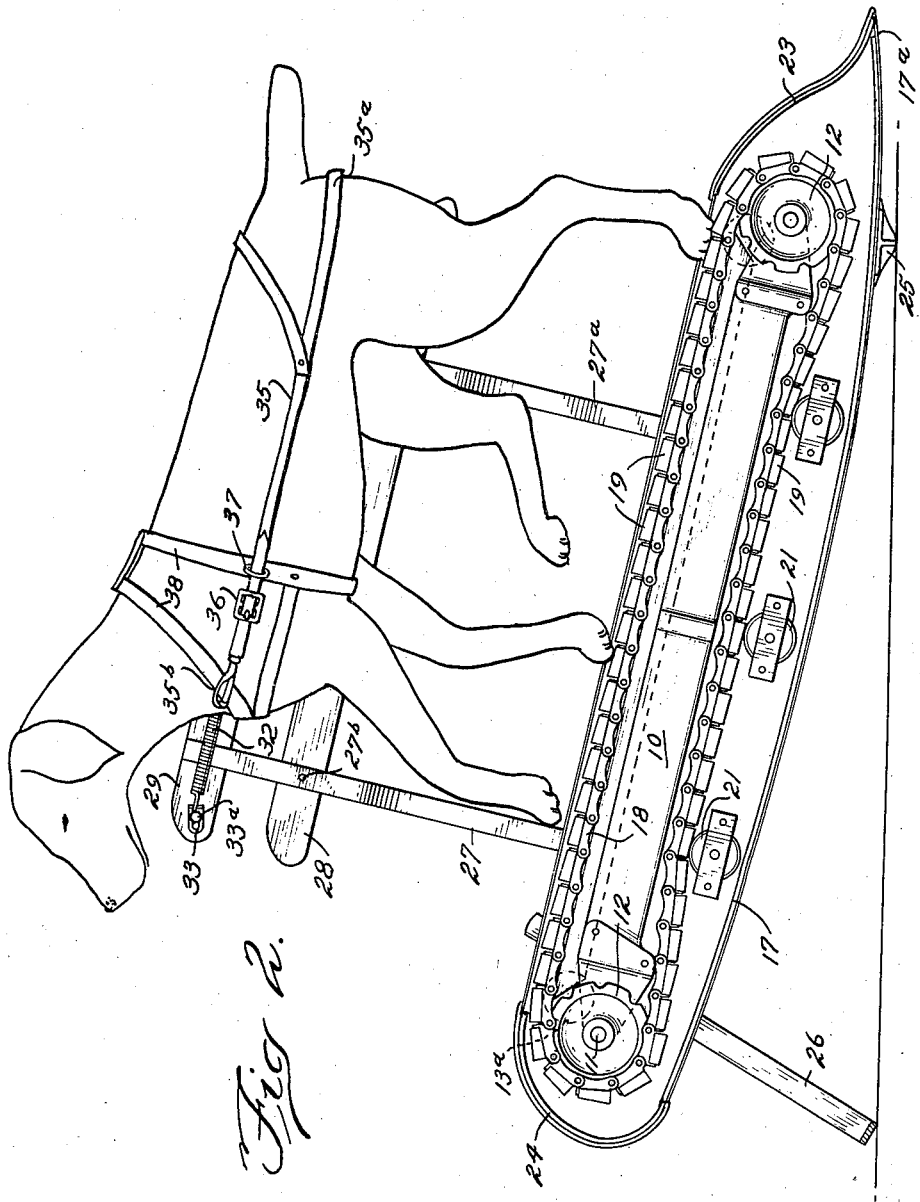

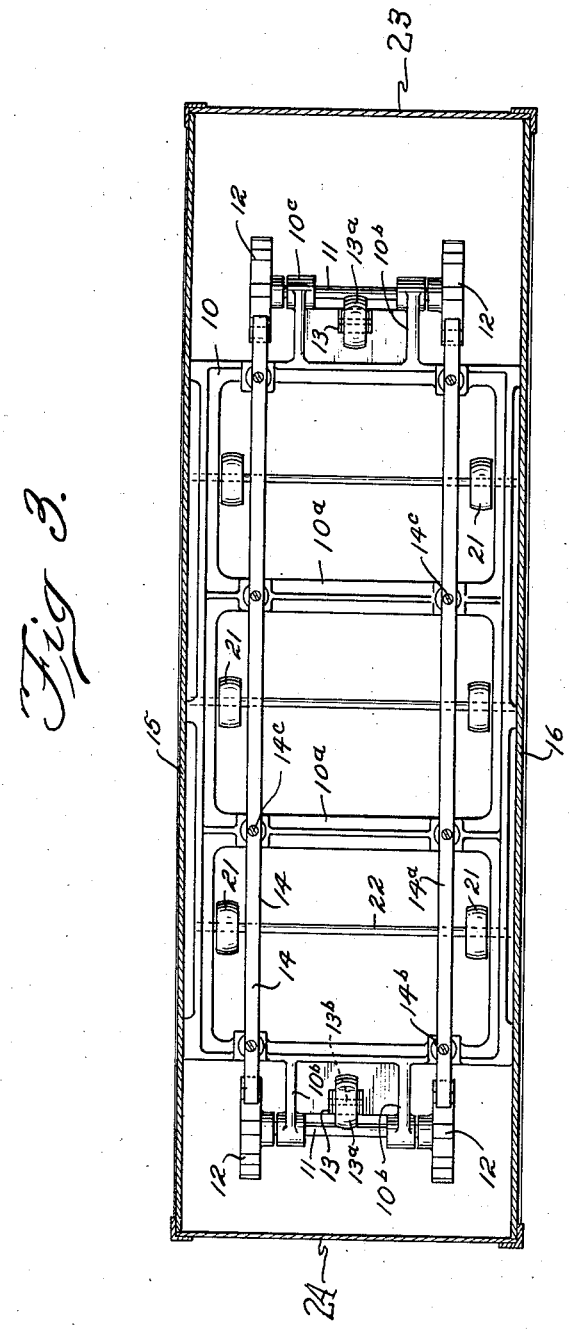

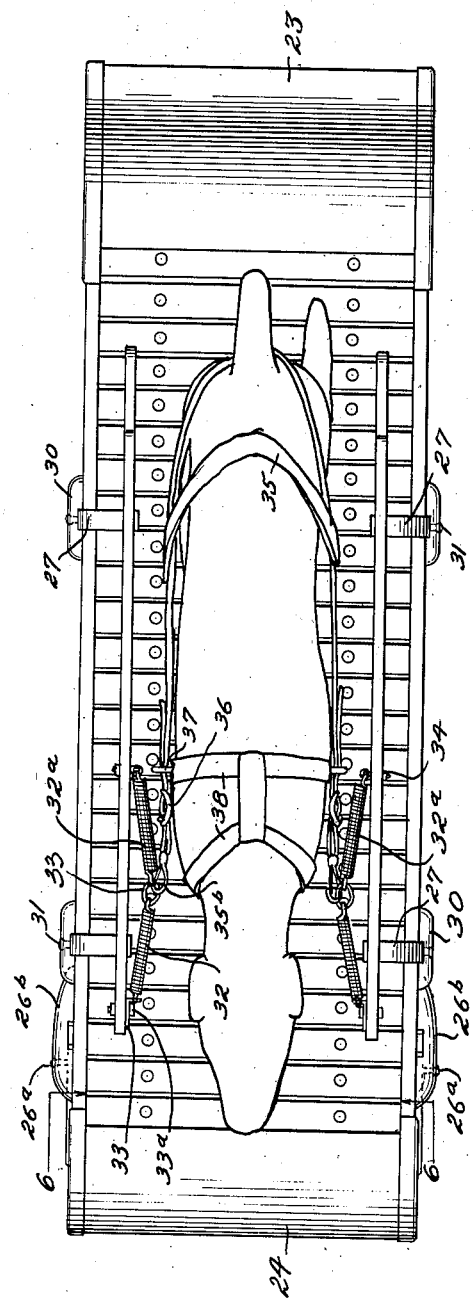

April 25, 1939. J. R. RICHARDS 2,155,684
DOG EXERCISING DEVICE
Filed July 1, 1937 6 Sheets-Sheet 5
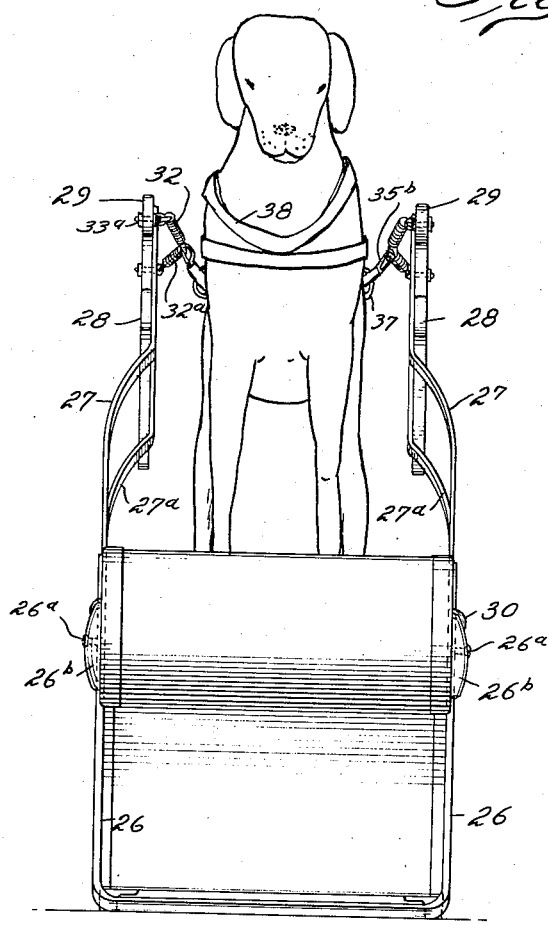
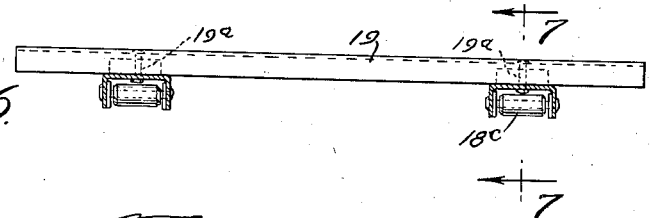
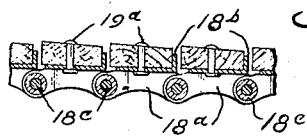
INVENTOR.
John R. Richards
BY John F. Brezina
ATTORNEY.

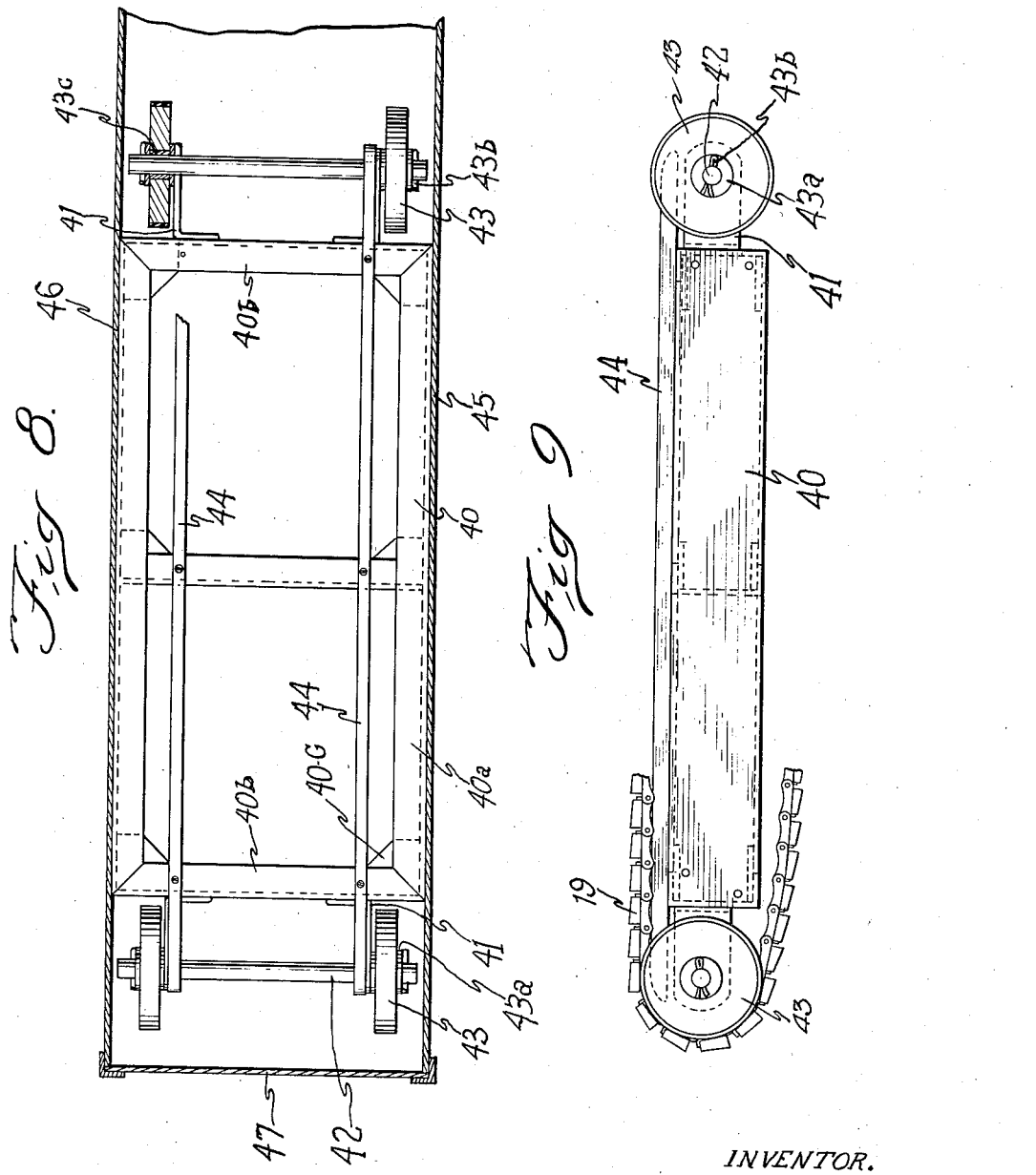

Patented Apr. 25, 1939

2,155,684

UNITED STATES PATENT OFFICE 2,155,684

DOG EXERCISING DEVICE

John R. Richards, Oak Park, Ill.

Application July 1, 1937, Serial No. 151,462

11 Claims. (Cl. 119—29)

My invention relates to an exercising device for dogs and other domestic pets and is particularly directed to a novel exercising device which is of the treadmill type, efficient and inexpensive.

An important object of my invention is the provision of an exercising device of the treadmill type, upon which a dog may be positioned, and into which he may be comfortably and conveniently strapped in such a manner that he may walk, run or exercise at practically any speed, according to his own desire, and without compulsion, preliminary training or instruction, and in which he may sit down, lay down or otherwise rest between intervals of actual exercise.

A further object of my invention is the provision of an exercise device for dogs which includes adjustable means for varying the incline thereof, which includes an adjustable resiliently mounted harness whereby the dog is maintained in preferred positions with respect to the upper surface of the tread belt.

Further objects of the invention include the provision of removable and adjustable side standards, resiliently mounted bracing and attaching means, to which the harness is connected, and an adjustable harness connectible to said resiliently mounted means, permitting complete freedom of movement of the dog, including change of position, rest, etc.

A further object of my invention is the provision of an exercise device of the treadmill type, including a frame having a plurality of idler sprocket wheels on the opposite ends thereof, a traveling tread belt mounted thereon, comprising a pair of metal link chains having transversely extending spaced apart treads secured on the respective links, the forward corners and edges of said treads being projected slightly upwardly to provide for convenient gripping thereof by the dog's feet and toes.

A further important object of my invention is the provision of an exercising device for dogs, or other domestic pets, of an inclined treadmill type which is so constructed and assembled that a dog may start or stop same of his own accord and at his own will, and which eliminates the necessity for any coaching or coercion, and which permits the dog to intermittently and at will operate and rest respectively, and which includes means for the yieldably and resiliently fastening of a harnessed dog with respect thereto to permit him to change positions and rest at will, and simultaneously providing comfortable means against which he can brace himself to stop or start the device.

Other important objects of my invention will be apparent from the following description and illustrations.

The invention (in the preferred form) is illustrated in the drawings and hereinafter more fully described.

On the drawings:

Fig. 2 is a partial side elevational view of my device, with the complete side panels, members and standards removed, and showing a side view of the tread belt and mounting means therefor.

Fig. 3 is a top plan view of the interior frame and rotatable sprockets about which the tread belt revolves.

Fig. 4 is a top plan view of my exercising device with dog harnessed therein.

Fig. 5 is a front elevational view of my device with a dog harnessed therein.

Fig. 6 is a cross sectional view of the tread belt itself showing the links and treads thereon and taken on line 6—6 of Fig. 4.

Fig. 7 is a fragmentary sectional view taken on line 7—7 of Fig. 6 and showing one of the links and treads.

Fig. 8 is a top plan view, with parts removed and broken away, of a modified and equivalent form of frame, and showing the side panels and end apron in cross section.

Fig. 9 is a side elevational view of the frame of Fig. 8.

Figure 1:
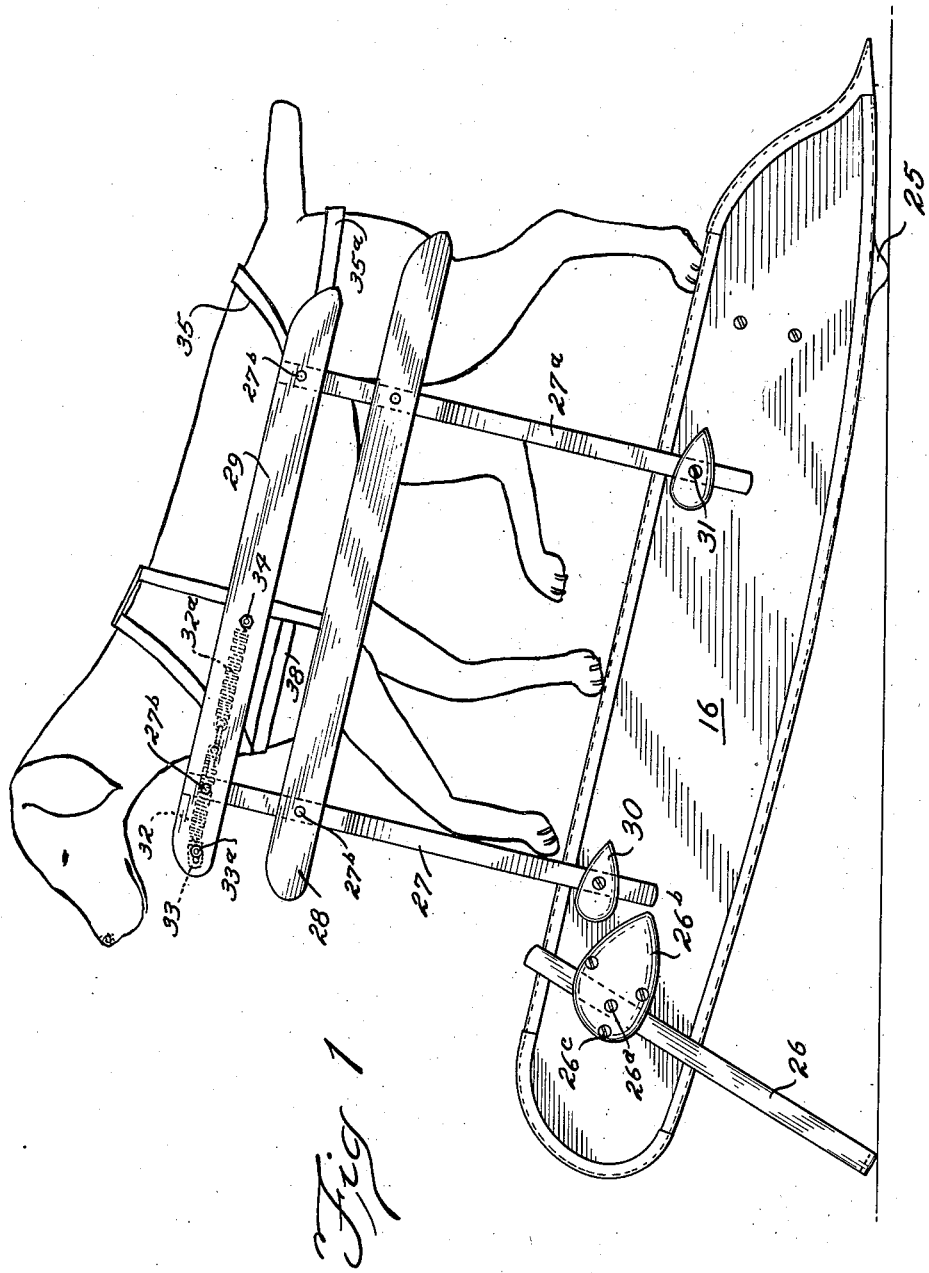
Fig. 1 is a side elevational view showing the external side surface of my exercising device, with a dog thereon.

Referring to the drawings, reference numeral 10 designates a substantially rectangular frame which is preferably cast or molded in one piece and which has a plurality of transversely extended reinforcing bars 10a and a pair of spaced apart integrally formed longitudinally extending arms 10b which terminate in apertured bosses 10c, the apertures of the bosses 10c at one end being in alignment. It is to be noted that a pair of said arms 10b projects substantially perpendicularly from each of the opposite ends of the frame 10 and that said apertured bosses 10c provide means for mounting a shaft 11, as clearly shown in Fig. 3, at each end of the frame.

The opposite ends of each said shafts 11 project beyond the bosses 10b respectively and have rotatably mounted thereon a plurality (preferably two at each end of the frame) of pulley wheels or sprocket wheels 12. Each of said sprocket wheels has a plurality of equally distant spaced apart transverse grooves or recesses which receive and engage the transverse pins or pintles of the links of each of a pair of endless link chains more fully hereinafter described.

As clearly shown in Fig. 3 a U-shaped bracket 13 is secured at each opposite end of frame 10 as by riveting, welding or the like, and said brackets extend upwardly and have rotatedly journalled thereon idler wheels or rollers 13a, pins 13b passing through said respective brackets and rollers, as clearly shown in dotted lines in Fig. 3. The idler rollers 13a are in such a position that the annular surface thereof will roll upon or support the under side of the upper run of the endless belt hereinafter described in order to prevent said belt from sagging at the points of said rollers 13a.

Referring to Fig. 3, reference numerals 14 and 14a designate a pair of parallel spaced apart longitudinally extending guide rails or strips which extend from the forward pulley wheel 12 to the rear pulley wheel 12 in alignment with each other. Said guide rails form a track upon which the upper run of the endless belt rides and they are so positioned as to maintain the upper run of the endless tread belt in a substantially single plane and to prevent sagging thereof.

As shown in the drawings, the guide rails 14 and 14a are mounted upon intermediate cylindrical members 14b, suitable screws 14c passing through said guide rails 14 and 14a and through cylindrical members 14b and threading into suitable correspondingly threaded apertures formed in frame 10.

The ends of guide rails 14 and 14a are preferably bevelled to form a bevelled end immediately adjacent respective pulley wheels 12 in order to avoid the possibility of the links of the tread belt catching on the ends of said rails.

Vertically extending side panels 15 and 16 are secured to frame 10 by means of suitable screws (not shown) which pass through at spaced apart points and threadingly engage correspondingly threaded apertures in frame 10, thereby securely holding said panels in proper position to form a part of the shell, housing or casing of the exercising apparatus as a whole.

As clearly shown in Fig. 1, the said side panels 15 and 16 have longitudinal side opening grooves immediately adjacent the lower edges thereof to provide for the convenient insertion, reception and retention of a flat bottom panel 17 of metal, wood or other suitable material, as clearly shown in Fig. 2.

The endless tread belt of my invention, clearly shown in Figs. 2, 4, 6 and 7, comprises a pair of endless chains 18, each chain being composed of a plurality of hingedly connected together metal links 18a shown in an enlarged fragmentary view showing the treads in cross section. Said links are each channel-like in shape and are formed by stamping or die-cutting from metal blanks which are then bent to form side portions and upwardly bent lip or lug 18b extending substantially perpendicularly from the central portion thereof for a purpose hereinafter explained.

The side portions of each of said links 18 are apertured at their ends and said links are connected together in a hinged and overlapping arrangement by suitable rivets. Rollers 18c are rotatably mounted on said rivets between the side sections of each link to permit each side chain to easily rotate about and be guided by the respective pulley wheels or sprockets 12.

The guide rails or tracks 14 and 14a are of a width sufficiently narrow so that the links partially saddle the guide rails or track as they ride therealong. A plurality of relatively narrow transverse treads 19, preferably made of wood, are secured on the transversely opposite links of said link chains in a manner clearly shown in Figs. 4, 6 and 7, by means of suitable rivets 19a or equivalent fastening means as shown in dotted lines in Fig. 6.

It is to be noted that such treads are trapezoidal in cross section, the upper and forward edges of said treads being higher and thicker than the rear edge thereof thereby causing the respective forward edges of said treads to project above the rear edge of the next adjacent tread to provide convenient, comfortable, grippable and non-skidding footing for a dog using such exercising device.

It will be apparent that the aforedescribed construction permits the dog to brace himself in every direction without slipping to either start the rotation of the tread belt or stop the same, or to diminish or increase its speed.

Each of the endless chains, one of which is shown in Fig. 2, is composed of a plurality of aforesaid links 18, and a plurality of transverse treads 19, one of each of said treads being mounted as before described on opposite links of said endless chains.

The upper run of each said endless chains of said tread belt is maintained in a substantially straight line and is prevented from sagging by upper guide rails 14 and 14a hereinbefore described, and also by means of two idler rollers 13a which are rotatably journalled in upwardly extended position adjacent the transverse shafts 11, and preferably substantially midway between the opposite sides of the device.

As indicated in Fig. 3, the idler rollers 13a are in a position so that the treads ride thereupon and maintain the tread belt and the chains thereof at a proper height.

The lower run of said tread belt is maintained against undesirable sagging by means of a plurality of rollers 21, shown in top plan view in Fig. 3, which are illustrated in Fig. 3 on each side of and rotatably journalled on three spaced apart fixed shafts 22 and at points adjacent the inner surfaces of the frame 10. Said shafts 22 have their opposite ends secured respectively in the opposite sides of the frame, as shown in Figs. 2 and 3. Said shafts 22 are so mounted that they can be moved vertically, either downwardly or upwardly, to regulate the tension of the tread belt and chains thereof.

Referring to Figs. 2 and 4, it will be noted that the lower panel 17 which is insertable into longitudinally opposed grooves on the inside surfaces of panels 15 and 16 terminates at its front end at a point adjacent to tread belt and its rear end terminates substantially rearwardly of the tread belt, as designated by reference numeral 17a.

A gradually curved upwardly sloping metal apron 23 is mounted on the rear end of the device and between side panels 15 and 16, the lower edge thereof being turned sharply back upon itself and forwardly, as clearly shown in Fig. 2, which apron may be secured to the edge of panel 17 along its transversely extending edge. The curvature of the metal apron and guard 23 is such that it will enable any dog or other domestic animal to ascend the exercising device and simultaneously be guarded against any contact with the moving end of the tread belt, the upper end of said apron and guard 23 being relatively close to but shortly spaced apart from the upper surfaces of the cross belt. The forward end of the device is enclosed and protected by a substantially semi-circular apron or guard 24 which extends between side panels 15 and 16 and its upper edge terminates at a point above the forward sprocket wheels or pulleys 12 and at a point relatively close to the upper surface of the tread belt, and said guard has the lower edge thereof removably secured to edge of the bottom panel 17. Said aprons or guards 23 and 24 are so mounted that they can be quickly and easily removed when access to the interior parts of the device is desired.

The above described construction of the metal aprons at the ends is such as to keep the dog from tearing or catching his claws between the treads as they open up in their travel over the ends of the device. An important feature of the aforedescribed construction is that the movable tread belt is so constructed that it affords a solid and steady footing at all times, which is an important feature in creating confidence in the dog and maintaining it.

A pair of feet 25, preferably made of metal, are secured to the bottom edges of side panels 15 and 16 respectively and a short distance from the rear end of the device, as clearly shown in Figs. 1 and 2. Said securance may be by screws passing through apertures in said metal and into said side panels. The forward end of the device is mounted and held in spaced-apart positions from the supporting surface by a U-shaped supporting bar 26, which is releasably and adjustably secured to the outer surfaces of side panels 15 and 16 by suitable screws 26a and by offset mounting plates or brackets 26b, said mounting plates 26b having vertically extending intermediate offset portions through which the upper portion of said U-bar is slidable and adapted to be secured and adjusted in desired position by screws 26a respectively. Said mounting plates 26b are securely mounted on panels 15 and 16 by screws 26c.

It will be apparent that the incline and height of the exercising device may be adjusted as desired to vary the speed and ease of movement of the tread belt by merely pivoting the device on the feet 25 and securing the bar 26 in the desired position by means of screws 26a so that the lower ends of legs 26 rest upon the floor or other supporting surface. The angle of inclination and height is increased in order to enhance the desire of the dog to run and to increase his speed of running and movement of the tread belt. This feature of adjustability is highly important in that the particular exercising device may be adjusted with respect to the weight and size of the dog so that the speed of the moving tread belt will be within desirable ranges and so that the dog may stop or start said tread belt without any appreciable effort or exertion, at the same time maintaining the device in a position of comfort to the dog wherein he may intermittently sit and rest on the tread belt.

A further highly important and novel feature of my invention is the means by which the dog is held and maintained in desirable positions on the exercising device and which enable the dog to comfortably brace himself, either forwardly or rearwardly, with respect to the tread belt, to either start, stop or accelerate same. This means consists of a pair of side sections, on each side of the device and extending vertically from the side panels thereof, comprising a pair of vertical standards 27, 27a and a pair of spaced apart longitudinal bars 28 and 29. Said longitudinal bars 28 and 29 are secured to vertically extending standards 27a respectively by means of screws 27b or equivalent fastening elements, and the lower end of standard 27a of each of said side sections is releasably and adjustably secured to the side panels 15 and 16 by means of suitable bracket plates 30 which are secured on said side panel in substantially the positions shown in Fig. 1, and are so formed as to permit standards 27 and 27a to slip therethrough to desired height and then be secured to desired height by suitable screws 31. Said standards may be slightly curved inwardly in order to maintain the longitudinal bars 28 and 29 in planes within the planes of the side panels 15 and 16, as clearly shown in Fig. 5, this being accomplished by curving said standards 27 and 27a slightly inwardly, as shown in said Fig. 5. The tendency of the average dog upon being placed on the device is to run sidewise and therefore, the above said side standards hold him in a plane parallel to the tread belt. Said side standards and the longitudinal bars thereon are of a construction to give the dog merely a feeling of restriction without a feeling of confinement.

As clearly shown in Figs. 1, 4 and 5, a further important novel feature of my invention is the provision of yieldable anchoring and bracing means to which a suitable adjustable harness worn by the dog may be attached. This means comprises a pair of coil springs 32 and 32a, connected together by suitable link 33 and the forward end of spring 32 being secured to the forward end of longitudinal bar 29 by slotted and adjustable links 33 which are anchored by suitable eyebolts 33a, and the rear end of spring 32a being secured to longitudinal bar 29 by eyelet bolt 34 in such a position to normally maintain springs in substantially longitudinal alignment. A pair of said springs 32 and 32a are secured, as before described, adjacent to the surface of one of the longitudinal bars 29 and similarly to the longitudinal bar on the opposite sides of the device, and are intended to be parallel and midway of the dog's shoulders.

A further important feature of my invention comprises the connection of the harness which includes the breeching strap 35 which may be formed in either one or more sections as clearly illustrated in Fig. 4, and includes a pair of adjustable buckles 36 which adjustably connect said strap with respect to said springs, said buckles 36 providing adjustment means whereby said breeching strap may be adjusted to fit the size of the particular dog. The rearmost portion 35a of said breeching strap passes around the rear end of the dog and below his tail and is adapted to exert a constant pressure against the dog which influences or causes the dog to intermittently walk, trot or run. The pressure of said breeching strap 35a against the dog is decreased and relieved to some extent when the dog walks, trots or runs, and is increased when the dog stops the movement of the tread belt and when he stands in or sits on the device. Due to the herein described harness construction which is adjusted to the length of the particular dog, when the dog does sit down, said breeching strap exerts a constant pressure on the rear of the dog and which forms and creates a psychological influence on the dog causing him to get up and walk and relieve the aforesaid pressure when the dog pushes forward, walks, trots or runs.

The forward ends of said breeching strap 35 have snap fasteners 35b secured thereon by means of the adjustable buckles 36, this permitting the said adjustable harness to be quickly removed by unsnapping said snap fasteners and withdrawing the respective forward ends of said strap 35 from within rings 37 which are secured on opposite sides of the dog's regular and conventional harness designated by reference numeral 38. The passage of the said side portion of breeching strap 35 through said rings 37 permits complete freedom of movement of the dog from side to side and in substantially any position which he desires to take on the device. The structural features described eliminate the necessity for training, coaxing or rewarding the dog in an effort to induce him to move the tread belt.

In Figs. 8 and 9, I show a slightly modified and equivalent frame forming the basis of my exercising device. Reference numeral 40 designates the frame per se composed of parallel longitudinal side truss bars 40a connected together at their opposite ends and substantially midway between their ends by cross connecting bars 40b, all of which are secured together at their points of intersection by spot welding metal brace and corner members 40c across said corners.

Right-angled brackets 41, four in number, two at each end, are secured by welding or the like to the opposite ends of frame 40, as shown in Fig. 8. The two brackets 41 at each end have secured therein, i. e., by welding or equivalent means, cross shafts 42, the opposite ends of each of which project in opposite directions. Wheels 43, preferably four in number, two at each end, are journalled on the ends of shafts 42 respectively and in alignment with each other and held thereon by washers 43a and cotter pins 43b which pass through the ends of the axles.

Guide rails or strips 44 are secured in parallel position on cross bars 40b and between the wheels 43 by suitable countersunk screws, as shown in Figs. 8 and 9, and form the guiding means or rails on which the links of the chain 18 and their rollers 18c ride.

The wheels 43 are so spaced and positioned that the respective treads 19 of the endless tread belt themselves engage and ride on said wheels, namely the inside surfaces of the treads contact the periphery of said wheels 43, and said tread belt is thereby easily rotatable with a minimum amount of noise and friction. As shown in Figs. 8 and 9, each of the wheels 43 has a peripheral lining or tire, preferably of rubber, and this being the surface contacted by the treads of the tread belt, the noise is substantially reduced and unnoticeable. Each of wheels 43 may also have a central bushing 43c to provide a permanent bearing.

As shown in Fig. 9, guide rails 44 are beveled at their ends, and the wheels 43 are of such size that as the treads and belt links pass thereover into the upper run, said links will slide over the said beveled ends and along said rails with very little friction.

Reference numerals 45 and 46 represent the demountable side panels, which are similar to side panels 15 and 16 of Fig. 3, and 47 designates the curved end aprons or guards, the ends of which terminate a short distance from each end of the device to leave exposed the upper run of the tread belt.

Further important advantageous features are that the individual treads, the separate links of the chain, link pins, the roller bearings rotatable on said pins, and the peripherally recessed sprocket wheels or rollers on which the chains of the tread belt rotate, are each separately and independently purchaseable and renewable by any average person of even limited mechanical ability, insuring low upkeep and long use of the device.

One of the important features and advantages of my invention is that it provides a device into which and upon which the dog and the harness are placed and are then left entirely alone without any coaxing or persuasion. It is found that some dogs, when first placed upon the tread belt, will sit for more or less than an hour, but invariably they get up on their feet and start to walk or trot, and successively sit down, trot and run.

Various changes may be made in the embodiment of the invention herein specifically described without departing from or sacrificing any of the advantages of the invention or any features thereof, and nothing herein shall be construed as limitations upon the invention, its concept or structural embodiment as to the whole or any part thereof except as defined in the appended claims.

I claim:

1. In an exercising device for dogs or the like, a frame; a plurality of rotatably journalled pulley wheels mounted at the ends of said frame, said pulley wheels being in substantially parallel planes; an endless tread belt rollable on said pulley wheels, said tread belt consisting of a pair of chains having a plurality of transverse treads secured thereon; means for supporting the upper run of said tread belt to prevent sagging thereof; means for adjusting and varying the incline of said frame, tread belt and connected parts; a pair of upwardly extending side standard sections attached to the opposite sides of said frame; a plurality of springs secured on each of said side standard sections, said springs being attached at spaced apart points on each of said sections, and an adjustable dog harness anchorable to said springs to permit forward or rearward movement of a dog and to provide a yieldable bracing means for a dog or the like.

2. In an exercising apparatus for dogs or the like, a portable frame; a plurality of pulleys journalled adjacent the opposite ends of said frame, certain of said pulleys being in longitudinal alignment; vertically extending side panels attached to said frame, adjustable means for varying the incline of said apparatus; an endless tread belt rollably mounted on said pulleys, said tread belt comprising a pair of link chains and a plurality of transversely extending treads secured on said links respectively; parallel guide members between said front and back pulleys, said tread belt normally resting on and frictionally engaging said guide members; a pair of vertically extending side standard sections on said side panels; and spring means on said standard sections adapted to form a yieldable means for attaching a dog or the like thereto adapted to stop undesired movement of the dog relative to the standard sections without jerking the dog.

3. In an exercising apparatus of the class described, a substantially rectangular frame; a transversely extending stub shaft mounted at each end of said frame; a plurality of transversely grooved sprocket wheels journalled on the ends of said stub shafts; vertically extending side panels secured to the sides of said frame; and endless tread belt rollable on said sprockets and comprising a pair of endless link chains and a plurality of transversely extending spaced apart treads; a plurality of idler rollers journalled on said side panels, the lower run of said endless tread belt being adapted to ride thereon; parallel guide members between said front and rear sprockets, the upper section of said endless belt normally riding on said guide members; a pair of legs slidably and adjustably connected on the forward ends of said side panels whereby the height and incline of said tread belt may be varied and adjusted; a pair of vertically extending side bar sections one on each side of said device and secured respectively to the opposite side panels thereof and extending substantially above said tread belt; a pair of connected-together springs secured on each of said side bar sections and depending inwardly; and an adjustable harness anchorable at each side to said springs respectively, said pairs of springs permitting both forward and rearward yielding movement of said harness.

4. In an exercising device for dogs or the like, a frame, a plurality of rotatably journalled pulley wheels mounted at the ends of said frame, said pulley wheels being in parallel planes; an endless tread belt rollable on said pulley wheels, said tread belt consisting of a pair of chains and having a plurality of transverse treads secured thereon; means for supporting the upper run of said tread belt to prevent sagging thereof; means for adjusting and varying the incline of said frame, tread belt and connected parts; a pair of upwardly extending side standard sections attached to the opposite sides of said frame; a plurality of springs being attached at spaced apart points on each of said sections, said springs extending forwardly and rearwardly and permitting rearward, forward, vertical or any directional movement of a dog harnessed and attached to said springs and providing yieldable bracing means whereby an attached dog may brace himself to rotate said tread belt.

5. In an exercising device for dogs or the like, a frame, a plurality of idler pulleys rotatably mounted adjacent the corners and opposite ends of said frame; an endless tread belt revolvable about said pulleys, said tread belt including a plurality of connected together links and cross treads, a housing enclosing said frame, pulleys and belt, though exposing the upper run of said belt; means for supporting the portions of said tread belt against sagging, vertically extending side standards releasably attached to said housing, and a plurality of springs secured to the upper portion of each of said standards, certain whereof extend rearwardly and forwardly from spaced apart points of attachment to said standards respectively; said springs permitting resilient yielding movement of an animal or the like fastened thereto.

6. In an exercising device for dogs or the like, a frame, a plurality of idler pulley wheels rotatably mounted adjacent the opposite ends of said frame; an endless tread belt movably mounted on said pulley wheels and consisting of chains comprising a plurality of connected together links and a plurality of transverse treads; guide members between said pulley wheels for guiding and supporting the intermediate sections of said tread belt; side and bottom panels mounted adjacent to and below said tread belt respectively; guard aprons mounted at the opposite ends of said tread belt; means for adjusting the incline of said device to vary the ease of rotation of said tread belt; vertically extending side standard sections adjustably mounted adjacent said side panels; and yieldable stretchable means attached to said side standard sections and a harness attachable to said stretchable means including a main body embracing portion, a breech strap connected to said body portion, and a forward breast embracing strap, said breech strap and said breast embracing strap providing means whereby a dog wearing the harness may brace himself in any direction.

7. In an exercising device for dogs or the like, a frame, a plurality of idler pulleys rotatably mounted adjacent the corners and opposite ends of said frame; an endless tread belt revolvable about said pulleys, said tread belt including a plurality of connected together links forming endless chains and cross treads secured thereon, a housing enclosing said frame, pulleys and belt, though exposing the upper run of said belt; means for adjusting the incline of said belt, housing and contained parts to desired position; means for supporting the portions of said tread belt against sagging; vertically extending side standards attached to said housing; yieldable and stretchable means mounted on said standards; and an adjustable harness for a dog or the like including a breech strap, said harness being releasably attached to said springs to provide for and permit a dog to comfortably and without shock stop or start said tread belt.

8. In an exercising device for dogs or the like, a frame, a plurality of idler pulleys rotatably mounted adjacent the corners and opposite ends of said frame; an endless tread belt movable about said pulleys, said tread belt including a plurality of connected together links forming endless chains and cross treads secured thereon, each of said links composed of a channel-like metal member of substantially U-shape cross section and having an upwardly extending integral lug adapted to be engaged by a tread secured to a pair of said links and including cross pins and rollers journalled thereon, the adjacent ends of the links of each endless chain overlapping each other and being pivotally connected by said pins, said link ends extending below the surface of said rollers; a housing enclosing said frame, pulleys and belt, though exposing the upper run of said belt; means for adjusting the incline of said belt, housing and contained parts to desired position; means for supporting the portions of said tread belt against sagging; vertically extending side standards attached to said housing and yieldable and stretchable means mounted on said standards to prevent abrupt shocks to a dog fastened to said yieldable means.

9. In an exercising device for dogs or the like, a rotatably mounted tread belt, a supporting frame, a plurality of wheels rotatably mounted with respect to said frame, said tread belt revolvably engaging said wheels, an adjustable upwardly extending side standard secured with respect to said frame on each side thereof, an adjustable harness adapted to be secured about the dog, said harness including a forward breast portion and an adjustable rear bracing strap normally engaging the rear legs of the dog; and stretchable means connecting and anchoring said harness to said side standards.

10. In an exercising device, a movably mounted tread belt, a supporting frame; a plurality of wheels journaled with respect to said frame, said tread belt revolvably engaging said wheels; an upwardly extending side standard releasably and adjustably mounted on each side of said frame; means adapted to be secured about a dog to normally cause said dog to remain on said tread belt including a breech strap adapted to pass around the rear of the dog and forwardly, the forward ends of said breech strap being attachable to said side standards respectively and spring means on each of said standards forming connections between the forward ends of said strap and said standards respectively, said securing means permitting forward or rearward bracing of the animal.

11. In an exercising device, a movably mounted tread belt, a supporting frame; a plurality of wheels journaled at the opposite ends of said frame, said tread belt movably engaging said wheels; a pair of upwardly extending side standards releasably and adjustably mounted on the sides of said frame respectively; each of said standards including a plurality of vertical bars connected together at their upper ends by cross bars; harnessing means including a body embracing strap, a breast strap and an adjustable breech strap adapted to pass about the hind legs of a dog or the like, said harnessing means adapted to be attached about a dog to normally cause said dog to remain on said tread belt; and spring means on each of said standards forming connections between the harnessing means and said standards, said harnessing means permitting forward or rearward bracing of the animal.

JOHN R. RICHARDS.